United States Patent Office 2,760,998
Patented Aug. 28, 1956

2,760,998

PREPARATION OF HYDROHALIC ACID ESTERS OF ALCOHOLS

Joseph Donald Surmatis, Pompton Plains, N. J., assignor to Hoffmann-La Roche Inc., Nutley, N. J., a corporation of New Jersey No Drawing. Application August 30, 1952,
Serial No. 307,359

13 Claims. (Cl. 260—654)

This invention relates to a process for the preparation of hydrohalic acid esters of aliphatic and cycloaliphatic alcohols. More particularly, it relates to a process of preparing a primary aliphatic halide or primary cycloaliphatic halide by treating a tertiary aliphatic alcohol or tertiary cycloaliphatic alcohol with an aqueous hydrohalic acid.

In its broad aspect, the invention relates to such a process of preparing a primary halide which comprises reacting an aqueous hydrohalic acid selected from the group consisting of hydrochloric acid and hydrobromic acid with a trisubstituted carbinol wherein one substituent is a monovalent hydrocarbon radical selected from the group consisting of aliphatic hydrocarbon radicals and cycloaliphatic hydrocarbon radicals, a second substituent is a radical selected from the group consisting of the vinyl radical and the isopropenyl radical, and the third substituent is a methyl radical. The invention can be illustrated graphically by the following equation:

$$R^1-\underset{\underset{CH_3}{|}}{\overset{\overset{OH}{|}}{C}}-\underset{\underset{R^2}{|}}{C}=CH_2 + HX \longrightarrow R^1-\underset{\underset{CH_3}{|}}{\overset{\overset{}{}}{C}}=\underset{\underset{R^2}{|}}{C}-CH_2-X$$

(A)  (B)

In the above equation, $R^1$ represents a monovalent aliphatic hydrocarbon radical or a monovalent cycloaliphatic hydrocarbon radical, $R^2$ represents H or methyl, and X represents chlorine or bromine.

A preferred aspect of the invention relates to processes of the kind described above in which $R^2$ represents hydrogen, and $R^1$ represents an isoprenoid hydrocarbon radical, viz. a radical having the structure

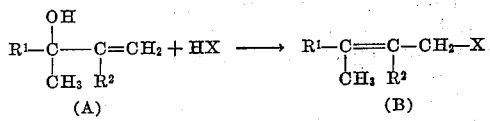

(C)

$n$ being preferably 1, 2 or 3.

A second preferred aspect of the invention relates to such processes wherein $R^2$ represents hydrogen, and $R^1$ represents a hydrogenated analog of the isoprenoid hydrocarbon radical (C) delineated above, viz. a radical behaving the structure

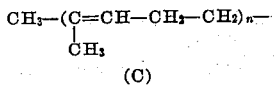

(D)

$n$ being preferably 1, 2 or 3.

A third preferred aspect of the invention relates to such processes wherein the radical $R^2$ is hydrogen, and the radical $R^1$ is cycloaliphatic and contains a 2,6,6-trimethyl-1-cyclohexenyl group, particularly such a cycloaliphatic radical containing a system of conjugated double bonds. Illustrative examples of $R^1$ in this preferred aspect are the radicals

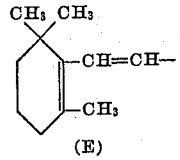

(E)

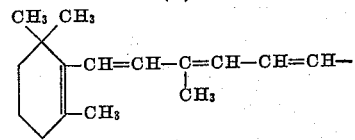

(F)

A fourth preferred aspect of the invention relates to such processes wherein the tertiary alcohol starting material is a methyl-butenol or a dimethyl-butenol comprehended within formula (A), e. g. 2-methyl-3-buten-2-ol or 2,3-dimethyl-3-buten-2-ol.

By way of illustration, but not of limitation, the invention is particularly applicable to the preparation of esters by the reaction of concentrated aqueous hydrochloric acid or concentrated aqueous hydrobromic acid with any of the following alcohols:

2-methyl-3-buten-2-ol
2,3-dimethyl-3-buten-2-ol
3,7-dimethyl-1-octen-3-ol
3,7,11-trimethyl-1-dodecen-3-ol
3,7,11,15-tetramethyl-1-hexadecen-3-ol
3,7,11-trimethyl-1,6,10-dodecatrien-3-ol
3,7,11,15-tetramethyl-1,6,10,14-hexadecatetraen-3-ol
3 - methyl - 5 - (2,6,6 - trimethyl - 1 - cyclohexenyl) - 1,4-pentadien-3-ol
3,7-dimethyl-9-(2,6,6-trimethyl-1-cyclohexenyl) - 1,4,6,8-nonatetraen-3-ol
3-methyl-1-penten-4-yn-3-ol
3,7-dimethyl-1,6-octadien-3-ol For practical purposes it is preferred that the concentration of aqueous hydrochloric acid employed in practicing the invention be in the range between about 20 per cent and about 43 per cent, and that the concentration of aqueous hydrobromic acid employed in practicing the invention be in the range between about 30 per cent and about 55 per cent; it will be appreciated by those skilled in the art to which this invention pertains that the numerical values indicated above are not absolutely limiting. In the region of higher acid concentrations within the ranges stated, some loss in yields may be experienced, e. g. because of by-product formation, such as that resulting from addition of hydrogen halide to unsaturation present in the alcohol starting material. In the region of lower acid concentrations within the ranges stated, yields may also be decreased and reaction times lengthened. Excellent results have been obtained—and this is one of the meritorious features of the invention—with commercial concentrated acids, i. e. aqueous hydrochloric acid of about 37 per cent concentration, and aqueous hydrobromic acid of about 48 per cent concentration, when operating at room temperature, e. g. at temperatures between about 20° C. and about 25° C. With aqueous hydrochloric acid of about 37 per cent concentration and with aqueous hydrobromic acid of about 48 per cent concentration, it is preferred to operate in the range between about 15° C. and about 30° C.

In order to obtain good yields, and especially in order to counteract the diluting effect upon the concentrated hydrohalic acid of water formed by the esterification reaction, it will ordinarily be desirable to employ at least about three molar proportions of concentrated aqueous hydrohalic acid for each mol of tertiary alcohol to be esterified.

The reaction can conveniently be conducted at temperatures between −5° C. and +40° C.; as will again be understood by those skilled in the art, these values are not absolutely limiting. With more dilute aqueous acids employed for purposes of this invention, it will usually be convenient to use higher temperatures within the range indicated, and conversely with more concentrated acids, lowest temperatures can be used to advantage.

Many of the tertiary alcohol starting materials employed in the practice of the invention contain an asymmetric carbon atom, and the invention is applicable to all of the racemic and optically active forms of such starting materials. Many of the primary halide products obtained according to the invention are capable of existing as geometric isomers, by virtue of varying stereochemical arrangements about the olefinic bond between the number 2 and number 3 carbon atoms. The invention is likewise applicable to the preparation of both "cis"- and "trans"- isomers by the processes disclosed herein.

In most cases, the primary halide products of the invention are obtained in a sufficient state of purity that they can be used in further syntheses, e. g. acetoacetic ester syntheses, with little or no purification.

The invention can be practiced to advantage in the preparation of both known and novel materials useful in the pharmaceutical, perfume, and aromatic chemicals industry. The following examples are illustrative, but not limitative, of what is claimed herein:

Example 1

172 g. of 2-methyl-3-buten-2-ol were placed in a 2 liter flask fitted with a mechanical stirrer. To this were added 800 cc. of 48 per cent aqueous hydrobromic acid and the mixture was stirred vigorously for ten minutes at room temperature. The stirring was stopped and the oil layer was separated. The acid layer was extracted with 500 cc. of benzene and the extract was added to the above mentioned oil layer. The combined liquids were washed twice, each time with 500 cc. of water, then dried over calcium chloride. The product was 1-bromo-3-methyl-2-butene.

The entire amount of 1-bromo-3-methyl-2-butene obtained from the above experiment was reacted with 365 g. of ethyl acetoacetate in the presence of 150 g. of sodium methylate, using 3 liters of benzene as solvent. The condensation product was then subjected to ketonic hydrolysis to yield 6-methyl-5-hepten-2-one.

Example 2

In a three-neck flask fitted with a mechanical stirrer were placed 154 g. of racemic 3,7-dimethyl-1, 6-octadien-3-ol. To this were added 650 cc. of aqueous 48 per cent hydrobromic acid and the mixture was stirred vigorously for ten minutes at room temperature. The oil layer was separated, the acid layer was extracted with 250 cc. of benzene, and the benzene extract was added to said oil layer. The combined oily material was washed twice, each time with 500 cc. of water, and dried over calcium chloride. The product was racemic 1-bromo-3,7-dimethyl-2, 6-octadiene.

The entire amount of 1-bromo-3,7-dimethyl-2,6-octadiene obtained above was reacted with ethyl acetoacetate by a procedure similar to that in Example 1. On ketonic hydrolysis, the condensation product yielded geranyl acetone.

Example 3

226 g. of racemic 3,7,11-trimethyl-1-dodecen-3-ol were placed in a two-liter flask provided with a mechanical stirrer. To this were added 800 cc. of 48 per cent aqueous hydrobromic acid. The mixture was stirred vigorously for 10 minutes at room temperature, the oil layer was removed, and the acid layer was extracted with 250 cc. of benzene. The benzene extract was added to said oil layer, the combined liquids were washed twice, each time with 500 cc. of water, and the washed material was dried over calcium chloride. The product was 1-bromo-3,7,11-trimethyl-2-dodecene.

Reaction of the product obtained above with ethyl acetoacetate, followed by ketonic hydrolysis, as described in Example 1, yielded 6,10,14-trimethyl-5-pentadecen-2-one.

Example 4

100 g. of 2,3-dimethyl-3-buten-2-ol were added to 400 cc. of 48 per cent aqueous hydrobromic acid at room temperature, and the resulting mixture was stirred for ten minutes. Stirring was stopped, the oil layer was removed by means of a separatory funnel and washed twice, each time with 500 cc. of water. The product was 1-bromo-2,3-dimethyl-2-butene.

On condensation with ethyl acetoacetate as described in Example 1, followed by ketonic hydrolysis, the product was 5,6-dimethyl-5-hepten-2-one.

Example 5

172 g. of 2-methyl-3-buten-2-ol were placed in a 2 liter flask fitted with a mechanical stirrer. To this were added 800 cc. of 37 per cent aqueous hydrochloric acid and the mixture was stirred vigorously at room temperature for 30 minutes. The oil layer was separated, the acid layer was extracted with 500 cc. of benzene, and the extract was added to the above mentioned oil layer. The combined liquids were washed twice with water (500 cc. of water in each wash), then dried over calcium chloride. The product was 1-chloro-3-methyl-2-butene.

The entire amount of 1-chloro-3-methyl-2-butene obtained from the above experiment was reacted with ethyl acetoacetate and subjected to ketonic hydrolysis, in the manner described in Example 1, to yield 6-methyl-5-hepten-2-one.

Example 6

In a three-neck flask fitted with a mechanical stirrer were placed 200 g. of racemic 3,7-dimethyl-1,6-octadien-3-ol. To this were added 800 cc. of 37 per cent aqueous hydrochloric acid and the mixture was stirred vigorously for 30 minutes at room temperature. The oil layer was separated and washed twice, each time with 500 cc. of water, and dried over calcium chloride. The product was racemic 1-chloro-3,7-dimethyl-2,6-octadiene.

The 1-chloro-3,7-dimethyl-2,6-octadiene obtained above was reacted with ethyl acetoacetate by a procedure similar to that in Example 1. On ketonic hydrolysis, the condensation product yielded geranyl acetone.

Example 7

226 g. of racemic 3,7,11-trimethyl-1-dodecen-3-ol were placed in a two-liter flask provided with a mechanical stirrer. To this were added 800 cc. of 37 per cent aqueous hydrochloric acid. The mixture was stirred vigorously at room temperature for 30 minutes, the oil layer was separated and washed twice with 500 cc. of water, and the washed material was dried over calcium chloride. The product was 1-chloro-3,7,11-trimethyl-2-dodecene.

Example 8

A mixture of 100 g. of 2,3-dimethyl-3-buten-2-ol and 400 cc. of 37 per cent aqueous hydrochloric acid was stirred at room temperature for ten minutes. Stirring was stopped, the oil layer was removed and washed twice, each time with 500 cc. of water and dried. The product was 1-chloro-2,3-dimethyl-2-butene.

On condensation with ethyl acetoacetate, followed by ketonic hydrolysis, as described in Example 1, the product was 5,6-dimethyl-5-hepten-2-one.

Example 9

96 g. of 3-methyl-1-penten-4-yn-3-ol were placed in a flask fitted with a mechanical stirrer. To this were added 400 cc. of 37 per cent aqueous hydrochloric acid, and the mixture was stirred vigorously for 5 minutes at room temperature. The stirring was stopped, and the oil layer was separated and washed twice, each time with 200 cc. of water. The washed oil layer was dried over calcium chloride and then distilled. The product boiling at 42° C./22 mm. was 1-chloro-3-methyl-2-penten-4-yne.

*Example 10*

96 g. of 3-methyl-1,4-pentadien-3-ol were placed in a flask with 400 cc. of 37 per cent aqueous hydrochloric acid and stirred for 30 minutes at room temperature. The oil layer was separated, washed with water, and dried over calcium chloride. The product obtained was 1-chloro-3-methyl-2,4-pentadiene.

On condensation of this product with ethyl acetoacetate followed by ketonic hydrolysis, as described in Example 1, the product obtained was 6-methyl-5,7-octadien-2-one.

The starting material, 3-methyl-1,4-pentadien-3-ol, was made in the following manner: 200 g. of 3-methyl-1-penten-4-yn-3-ol in 2 l. of petroleum ether containing 2 g. of a palladium-lead hydrogenation catalyst [prepared according to the procedure of Lindlar, Helv. Chim. Acta 35, 450 (1952)], was hydrogenated, at room temperature and at a hydrogen pressure of 1 atmosphere absolute, until the hydrogen uptake ceased. The product, B. P. 115° C./760 mm. was 3-methyl-1-,4-pentadien-3-ol.

I claim:

1. A process of preparing a primary halide which comprises reacting an aqueous hydrohalic acid selected from the group consisting of hydrochloric acid and hydrobromic acid with a trisubstituted carbinol wherein one substituent is a monovalent hydrocarbon radical selected from the group consisting of aliphatic hydrocarbon radicals and cycloaliphatic hydrocarbon radicals, a second substituent is a radical selected from the group consisting of the vinyl radical and the isopropenyl radical, and the third substituent is a methyl radical.

2. A process which comprises reacting a concentrated aqueous hydrohalic acid selected from the group consisting of hydrochloric acid and hydrobromic acid with a tertiary alcohol having the formula $$CH_3-(C=CH-CH_2-CH_2)_n-\underset{\underset{CH_3}{|}}{\overset{\overset{OH}{|}}{C}}-CH=CH_2$$

$$\phantom{CH_3-(}\underset{CH_3}{|}$$

wherein $n$ is a number selected from the series 1, 2 and 3 to produce a primary halide having the formula $$CH_3-(C=CH-CH_2-CH_2)_n-C=CH-CH_2-X$$
$$\phantom{CH_3-(}\underset{CH_3}{|}\phantom{-CH_2-CH_2)_n-}\underset{CH_3}{|}$$

wherein X is selected from the group consisting of chlorine and bromine and $n$ has the same value as in said tertiary alcohol.

3. A process which comprises reacting a tertiary alcohol having the formula $$R^1-\underset{\underset{CH_3}{|}}{\overset{\overset{OH}{|}}{C}}-\underset{\underset{R^2}{|}}{C}=CH_2$$

wherein $R^1$ represents a member of the group consisting of monovalent aliphatic hydrocarbon radicals and monovalent cycloaliphatic hydrocarbon radicals, and $R^2$ represents a member of the group consisting of the hydrogen radical and the methyl radical with concentrated aqueous hydrobromic acid to produce a primary bromide having the formula $$R^1-\underset{\underset{CH_3}{|}}{C}=\underset{\underset{R^2}{|}}{C}-CH_2-Br$$

wherein $R^1$ and $R^2$ respectively represent the same radicals as in said tertiary alcohol.

4. A process according to claim 3 wherein the concentration of the hydrobromic acid is between about 30 per cent and about 55 per cent, and the reaction temperature is beetween about minus 5° C. and about 40° C.

5. A process which comprises reacting a tertiary alcohol having the formula $$R^1-\underset{\underset{CH_3}{|}}{\overset{\overset{OH}{|}}{C}}-\underset{\underset{R^2}{|}}{C}=CH_2$$

wherein R represents a member of the group consisting of monovalent aliphatic hydrocarbon radicals and monovalent cycloaliphatic hydrocarbon radicals, and $R^2$ represents a member of the group consisting of the hydrogen radical and the methyl radical with concentrated aqueous hydrochloric acid to produce a primary chloride having the formula $$R^1-\underset{\underset{CH_3}{|}}{C}=\underset{\underset{R^2}{|}}{C}-CH_2-Cl$$

wherein $R^1$ and $R^2$ respectively represent the same radicals as in said tertiary alcohol.

6. A process according to claim 5 wherein the concentration of the hydrochloric acid is between about 20 per cent and about 43 per cent, and the reaction temperature is between about minus 5° C. and about 40° C.

7. A process of preparing a 1-halo-3-methyl-2-butene which comprises reacting 2-methyl-3-buten-2-ol with a concentrated aqueous hydrohalic acid selected from the group consisting of hydrochloric acid and hydrobromic acid.

8. A process of preparing a 1-halo-2,3-dimethyl-2-butene which comprises reacting 2,3-dimethyl-3-buten-2-ol with a concentrated aqueous hydrohalic acid selected from the group consisting of hydrochloric acid and hydrobromic acid.

9. A process which comprises reacting a concentrated aqueous hydrohalic acid selected from the group consisting of hydrochloric acid and hydrobromic acid with a tertiary alcohol having the formula $$CH_3-(CH-CH_2-CH_2-CH_2)_n-\underset{\underset{CH_3}{|}}{\overset{\overset{OH}{|}}{C}}-CH=CH_2$$
$$\phantom{CH_3-(}\underset{CH_3}{|}$$

wherein $n$ is a number selected from the series 1, 2 and 3 to produce a primary halide having the formula $$CH_3-(CH-CH_2-CH_2-CH_2)_n-C=CH-CH_2-X$$
$$\phantom{CH_3-(}\underset{CH_3}{|}\phantom{-CH_2-CH_2-CH_2)_n-}\underset{CH_3}{|}$$

wherein X is selected from the group consisting of chlorine and bromine and $n$ has the same value as in said tertiary alcohol.

10. A process of preparing a primary halide which comprises reacting an aqueous hydrohalic acid selected from the group consisting of commercial concentrated aqueous hydrochloric acid and commercial concentrated aqueous hydrobromic acid at about room temperature with a carbinol substituted thrice by a lower alkyl radical, the vinyl radical and the methyl radical, respectively.

11. A process of preparing a primary halide which comprises reacting an aqueous hydrohalic acid selected from the group consisting of commercial concentrated aqueous hydrochloric acid and commercial concentrated aqueous hydrobromic acid at about room temperature with a carbinol substituted thrice by an alkenyl radical, the vinyl radical and the methyl radical, respectively.

12. A process of preparing a primary halide which comprises reacting an aqueous hydrohalic acid selected from the group consisting of commercial concentrated aqueous hydrochloric acid and commercial concentrated aqueous hydrobromic acid at about room temperature with a carbinol substituted thrice by a cycloalkenalkenyl radical, the vinyl radical and the methyl radical, respectively.

13. A process of preparing a primary halide which comprises reacting an aqueous hydrohalic acid selected from the group consisting of commercial concentrated aqueous hydrochloric acid and commercial concentrated aqueous hydrobromic acid at about room temperature with a carbinol substituted thrice by a lower alkyl radical, the isopropenyl radical and the methyl radical, respectively.

References Cited in the file of this patent

UNITED STATES PATENTS 2,315,580   Behnisch _____ Apr. 6, 1943

FOREIGN PATENTS 508,891   Germany _____ Oct. 2, 1930

OTHER REFERENCES

Whitmore, "Organic Chemistry," Van Nostrand Co., Inc., New York (1937), p. 146.

Wheland, "Advanced Organic Chemistry," Wiley and Sons, Inc., London (1949), pp. 535–544.